United States Patent
Kaneda

(10) Patent No.: US 9,781,302 B2
(45) Date of Patent: Oct. 3, 2017

(54) IMAGE FORMING APPARATUS FOR AVOIDING A FEEDING DIRECTION RESTRICTION WHEN PRINTING

(71) Applicant: CANON KABUSHIKI KAISHA, Tokyo (JP)

(72) Inventor: Takeshi Kaneda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 14/603,247

(22) Filed: Jan. 22, 2015

(65) Prior Publication Data

US 2015/0220820 A1 Aug. 6, 2015

(30) Foreign Application Priority Data

Jan. 31, 2014 (JP) .................. 2014-017739

(51) Int. Cl.
| | |
|---|---|
| *H04N 1/405* | (2006.01) |
| *G06K 15/02* | (2006.01) |
| *G06T 3/60* | (2006.01) |
| *H04N 1/387* | (2006.01) |

(52) U.S. Cl.
CPC ......... *H04N 1/405* (2013.01); *G06K 15/1861* (2013.01); *G06K 15/1881* (2013.01); *G06T 3/60* (2013.01); *H04N 1/3877* (2013.01)

(58) Field of Classification Search
CPC ........... G06K 15/1861; G06K 15/1881; G06K 15/1223; G06K 15/1843; G06K 15/1873; G06K 15/1876; G06K 2215/0057; G06K 2215/0071; H04N 1/40018; H04N 1/405; H04N 1/33315; H04N 1/3871; H04N 1/3935; H04N 1/40068; H04N 1/3877; H04N 1/40087; H04N 1/52; H04N 1/40501–1/40591; G06T 3/4002–3/4092; G06T 3/6001–3/6091

See application file for complete search history.

(56) References Cited

U.S. PATENT DOCUMENTS

| | | | | |
|---|---|---|---|---|
| 6,519,053 | B1* | 2/2003 | Motamed ............. | G06F 3/1211 358/1.12 |
| 6,829,063 | B1* | 12/2004 | Allebach ................. | H04N 1/52 358/3.13 |
| 2001/0002215 | A1* | 5/2001 | Katsuyama ............ | G06K 9/346 382/171 |

(Continued)

FOREIGN PATENT DOCUMENTS

JP 2013-7894 A 1/2013

*Primary Examiner* — Nicholas Pachol
(74) *Attorney, Agent, or Firm* — Fitzpatrick, Cella, Harper & Scinto

(57) ABSTRACT

An image forming apparatus analyzes image data corresponding to a received job, and when as a result of the analysis is that the image data has a resolution that exceeds a predetermined value, determines a size of a sheet to be printed, and when a result of the determination is that the size of the sheet is a predetermined size, if a size of the image data is less than or equal to a threshold, stores image data to which halftoning processing is not performed in a memory, and if the size of the image data exceeds the threshold, stores image data to which the halftoning processing is performed in the memory, and based on a direction of the sheet, performs image forming on the sheet after performing rotation processing for the stored image data.

14 Claims, 10 Drawing Sheets

(56) References Cited

U.S. PATENT DOCUMENTS

| | | | |
|---|---|---|---|
| 2003/0043905 A1* | 3/2003 | Nakayama | H04N 1/411 375/240.04 |
| 2003/0226116 A1* | 12/2003 | Kuwata | G06F 17/24 715/234 |
| 2004/0039995 A1* | 2/2004 | Kuwata | G06F 17/24 715/255 |
| 2004/0042818 A1* | 3/2004 | Mizutani | G03G 15/0896 399/119 |
| 2005/0012962 A1* | 1/2005 | Kido | H04N 1/3873 358/1.18 |
| 2005/0219300 A1* | 10/2005 | Fujita | B41J 11/0065 347/16 |
| 2005/0286087 A1* | 12/2005 | Hirano | G06K 15/02 358/3.27 |
| 2007/0147689 A1* | 6/2007 | Tanaka | H04N 1/642 382/232 |
| 2008/0008378 A1* | 1/2008 | Andel | G06K 9/2054 382/141 |
| 2008/0008379 A1* | 1/2008 | Andel | G06K 9/2054 382/141 |
| 2008/0225327 A1* | 9/2008 | Smith | G06F 3/1288 358/1.15 |
| 2009/0009782 A1* | 1/2009 | Arakawa | H04N 1/00856 358/1.9 |
| 2009/0080768 A1* | 3/2009 | Miaou | G06K 9/38 382/156 |
| 2009/0244633 A1* | 10/2009 | Johnston | H04N 1/648 358/3.23 |
| 2009/0245629 A1* | 10/2009 | Hayami | H04N 1/648 382/166 |
| 2009/0245630 A1* | 10/2009 | Johnston | H04N 1/648 382/166 |
| 2009/0245665 A1* | 10/2009 | Johnston | G03G 15/5087 382/235 |
| 2009/0290009 A1* | 11/2009 | Suzuki | B41J 2/447 347/129 |
| 2010/0241805 A1* | 9/2010 | Ono | G06F 17/3028 711/118 |
| 2011/0181895 A1* | 7/2011 | Ooyanagi | G06K 15/1881 358/1.2 |
| 2011/0255134 A1* | 10/2011 | Shigeta | B41C 1/05 358/3.3 |
| 2011/0317205 A1* | 12/2011 | Naito | G06F 3/1215 358/1.15 |
| 2011/0317208 A1 | 12/2011 | Kaneda | |
| 2012/0008861 A1* | 1/2012 | Narita | H04N 1/64 382/166 |
| 2012/0170849 A1* | 7/2012 | Saka | G06K 9/346 382/195 |
| 2012/0170871 A1* | 7/2012 | Ishikawa | G06T 1/20 382/305 |
| 2012/0188569 A1* | 7/2012 | Yuan | G06F 3/1208 358/1.9 |
| 2012/0287151 A1* | 11/2012 | James | G09G 5/005 345/628 |
| 2015/0015917 A1* | 1/2015 | Hirohata | H04N 1/00432 358/3.24 |
| 2015/0220824 A1* | 8/2015 | Kikuta | G06K 15/1881 358/3.05 |

* cited by examiner

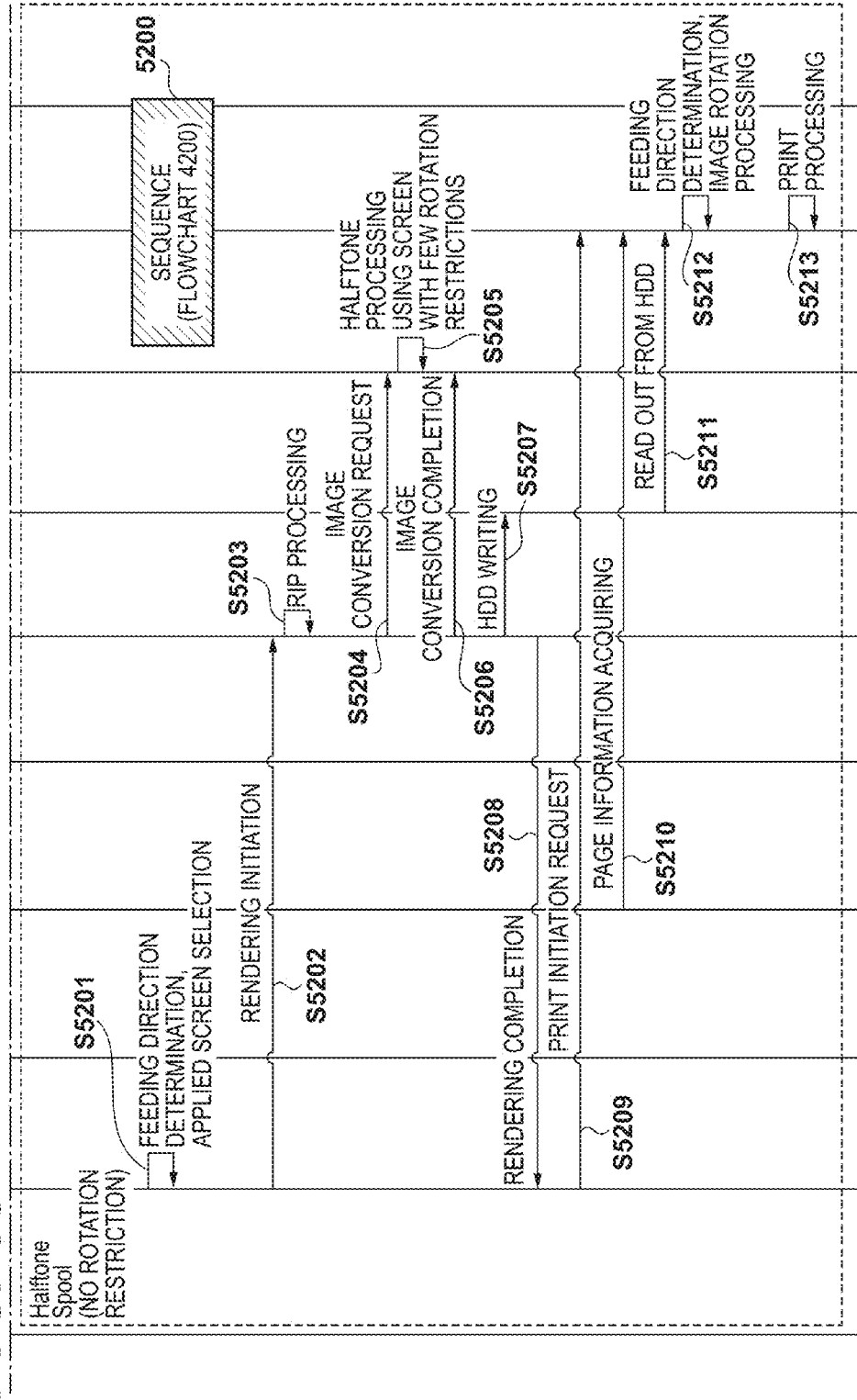

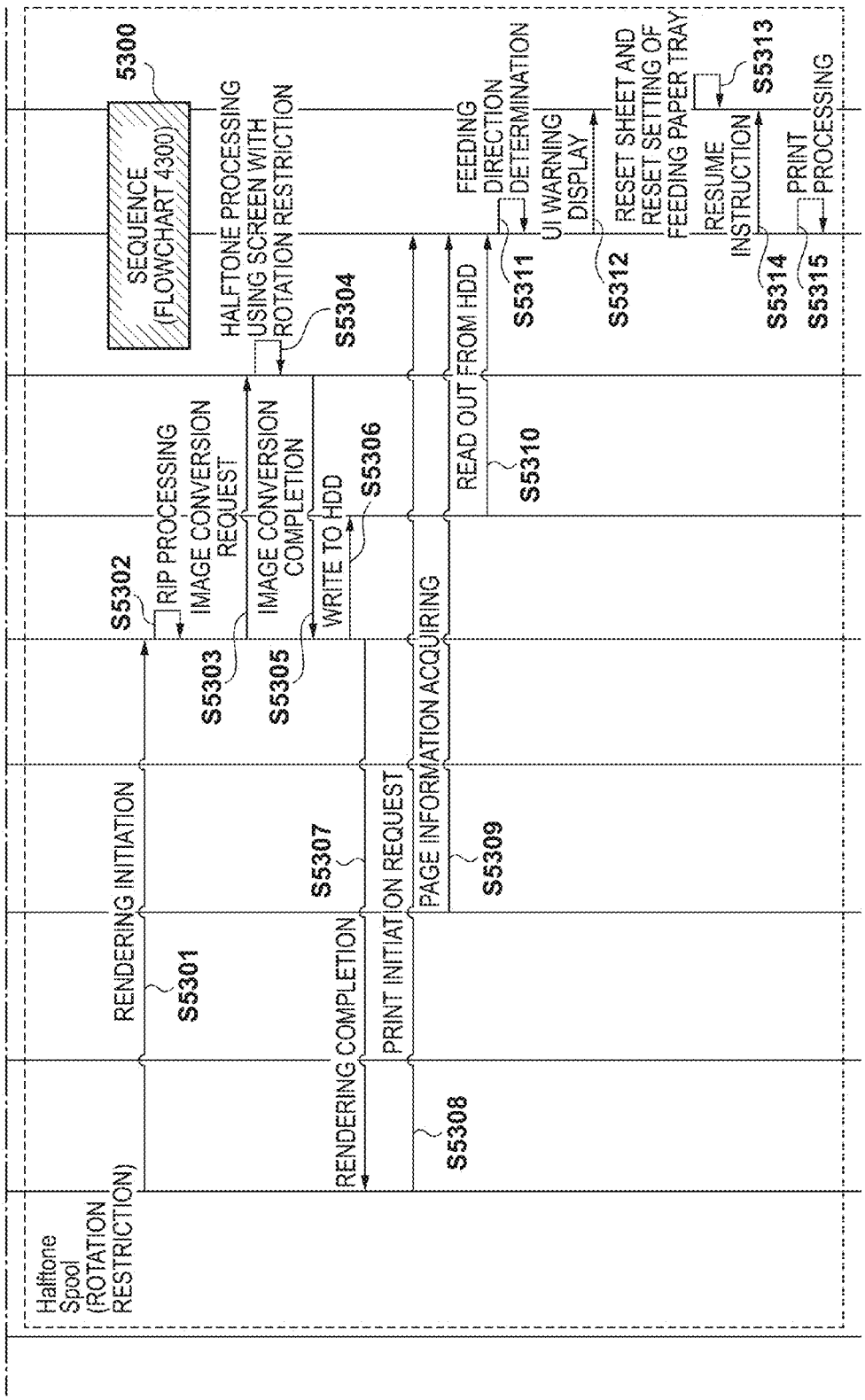

DITHER WITH 45 DEGREES ROTATION ANGLE

— 610

DITHER WITHOUT 45 DEGREES ROTATION ANGLE

— 620

IMAGE FORMING APPARATUS FOR AVOIDING A FEEDING DIRECTION RESTRICTION WHEN PRINTING

BACKGROUND OF THE INVENTION

Field of the Invention

The present invention relates to an image forming apparatus that, when processing print data transmitted from a host PC, avoids a feeding direction restriction for when printing, to a method of controlling the same, and to a storage medium.

Description of the Related Art

In image forming apparatuses, in regards to special print media such as "a postcard" or "an envelope", due to restrictions in a sheet conveyance mechanism and restrictions in image forming processing, various restrictions arise in association with a feeding direction, a direction of a leading edge/trailing edge in sheet feeding, or the like. In Japanese Patent Laid-Open No. 2013-7894, in order to avoid such restrictions, for a print image generated in a particular direction on a host side, an image is rotated in accordance with a sheet direction in which feeding is actually performed within an image forming apparatus.

On the other hand, a processing load is high for image rotation processing on high resolution data, and in mid/low speed range image forming apparatuses, the performance of equipped hardware calculation capabilities is insufficient with respect to an output speed of a print engine. Models of this kind are equipped with protection processing such as stopping printing in a case where image rotation processing is performed considering a device feeding direction on the host side or where an input image does not match the feeding direction of the image forming apparatus, since printing is impossible.

However, there is a problem with the above described conventional technique as recited below. For an image forming apparatus, a capability to print to various kinds of media is required, and one of these kinds of media is an envelope. In an envelope, because two sheets are pasted together, and because a diameter of a paper feed roller is small when a bend in the sheet conveyance path in the image forming apparatus is at an acute angle, it is easy for a distortion to occur in the two sheets of paper comprising the front and back of the envelope and for a rear edge side to become wrinkled depending on a paper quality of the envelope. In order to avoid the occurrence of such a wrinkle, a sheet width in a sub-scanning direction is shortened by setting the sheet such that a main-scanning side is the longer side of the envelope and the sub-scanning side is the shorter side of the envelope when printing, thereby reducing the distortion of the sheet and thus reducing the occurrence of wrinkles.

Meanwhile, there is a flap on an envelope, and there are cases in which depending on the flap width, the longer side of the envelope exceeds an upper limit on the main-scanning side in the printing. In such a case, it becomes necessary to make the shorter side of the envelope be the main-scanning side, and the longer side be the sub-scanning side. Because of the two reasons described above, in accordance with the paper quality and the shape including the flap part of the envelope that the user selects and sets in the paper feed tray, which of the shorter side or the longer side faces the main-scanning side changes. For this reason, in the image forming apparatus, it becomes important to rotate the image in accordance with the sheet feeding direction of the envelope.

However, in an image forming apparatus having low calculation capabilities, in a case where image rotation processing is performed in accordance with the paper feed tray when printing, when the resolution of the target image is high, the processing load becomes high, and the printing speed is reduced. In such a case, by the above described conventional technique, for high resolutions, out of concern that processing loads will increase, an image for which a rotation direction is determined in advance is generated and saved, and in a case where rotation processing is necessary, due to the direction that the sheet is placed in, or the like, measures are taken to quit the printing itself. However, in this kind of control, it is necessary for the user to always consider the direction of the sheet, but this is inconvenient.

SUMMARY OF THE INVENTION

The present invention enables realization of an arrangement in which, in a case where media for which a print image direction and a feeding direction are matched, causes the direction of the print image to match the feeding direction as much as possible while avoiding a reduction in printing speed.

One aspect of the present invention provides an image forming apparatus, comprising: an analysis unit configured to, when a job is received, analyze image data corresponding to the job; a size determination unit configured to, in a case where as a result of the analysis by the analysis unit is that the image data has a resolution that exceeds a predetermined value, determine a size of a printing medium on which to form an image corresponding to the image data; a storage unit configured to, in a case where a result of the determination by the size determination unit is that the size of the printing medium is a predetermined size, if a size of the image data is less than or equal to a threshold, store image data to which halftoning processing is not performed in a memory unit, and if the size of the image data exceeds the threshold, store image data to which the halftoning processing is performed in the memory unit; and a control unit configured to, in accordance with a direction of the printing medium, perform image forming on the printing medium after performing rotation processing for the image data stored in the memory unit.

Another aspect of the present invention provides a method of controlling an image forming apparatus, the method comprising: an analysis step of, when a job is received, analyzing image data corresponding to the job; a size determination step of, in a case where as a result of the analysis in the analysis step is that the image data has a resolution that exceeds a predetermined value, determining a size of a printing medium on which to form an image corresponding to the image data; a storage step of, in a case where a result of the determination in the size determination step is that the size of the printing medium is a predetermined size, if a size of the image data is less than or equal to a threshold, storing image data to which halftoning processing is not performed in a memory unit, and if the size of the image data exceeds the threshold, storing image data to which the halftoning processing is performed in the memory unit; and a control step of, in accordance with a direction of the printing medium, performing image forming on the printing medium after performing rotation processing for the image data stored in the memory unit.

Still another aspect of the present invention provides a non-transitory computer-readable storage medium storing a program for causing a computer to execute each step of the method of controlling the image forming apparatus.

Further features of the present invention will be apparent from the following description of exemplary embodiments with reference to the attached drawings.

BRIEF DESCRIPTION OF THE DRAWINGS

FIGS. 5A to 5D are a sequence diagram in the embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

<Image Forming Apparatus Configuration>

Below, explanation will be given for an embodiment of the present invention with reference to FIG. 1 through FIG. 6. First, explanation will be given for a system configuration according to the present embodiment with reference to FIG. 1.

An information processing apparatus 101 and an image forming apparatus 102 are communicatively connected to the system via a network 100. The information processing apparatus 101, upon editing and outputting print data, generates print data accompanying an option specification for a sheet size, type, paper feed tray, or the like and transmits the print data to the image forming apparatus 102. The print data received from the information processing apparatus 101 is received by the image forming apparatus 102, and the image is formed in accordance with the print data and in the direction matching with a printing sheet (a printing medium). Note, the present invention is not limited to the kinds of the apparatuses or the number of the apparatuses of the system shown in FIG. 1, and it is possible to employ other embodiments.

<Hardware Configuration>

Figure 1:
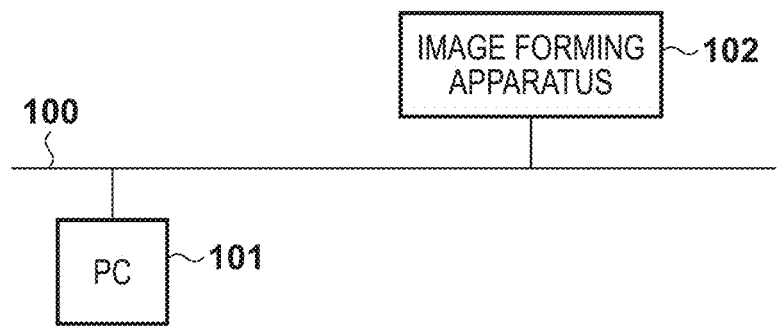
FIG. 1 is a system configuration diagram in an embodiment.
Figure 2:
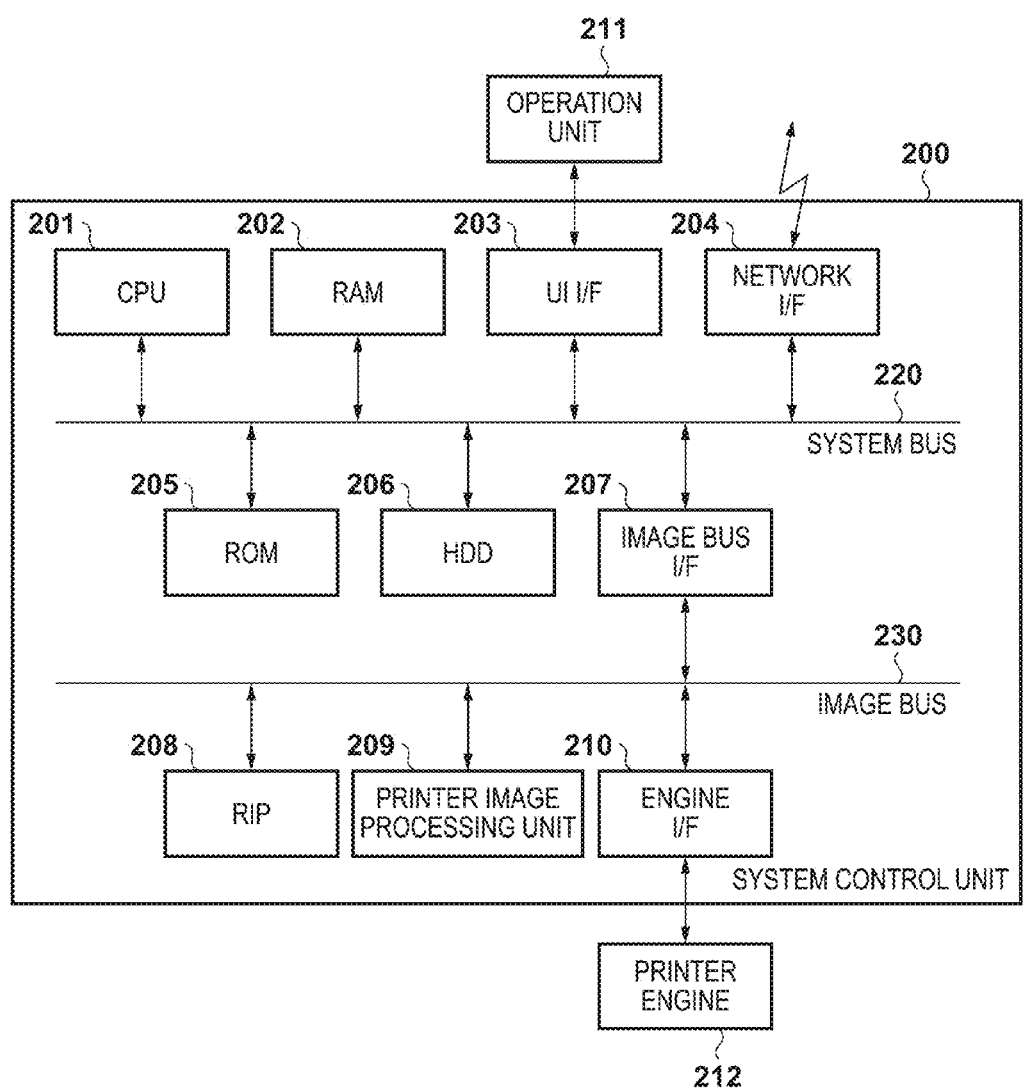
FIG. 2 is a hardware configuration diagram in the embodiment.
Figure 3:
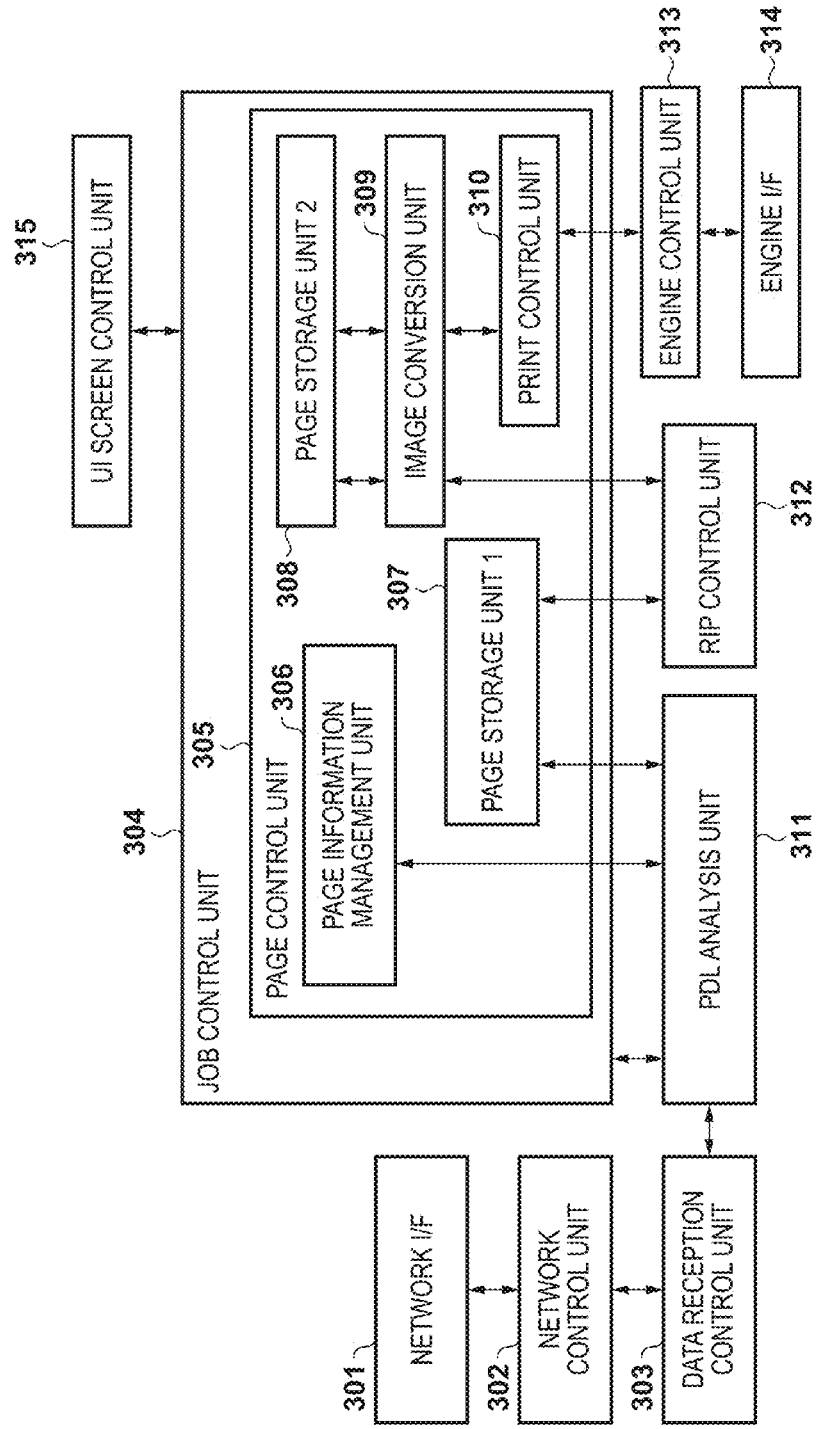
FIG. 3 is a software configuration diagram in the embodiment.

Next, explanation will be given for the hardware configuration of the image forming apparatus with reference to FIG. 2. The image forming apparatus 102 is equipped with a system control unit 200, an operation unit 211, and a printer engine 212. A CPU 201, a RAM 202, a UI I/F 203, a network I/F 204, a ROM 205, and an HDD 206 are connected to a system bus 220 in the system control unit 200 and are capable of performing communication with each other. Component on the system bus 220 are capable of accessing an RIP 208, a printer image processing unit 209, and a print engine I/F 210 connected to an image bus 230 via an image bus I/F 207. Software such as a job control unit 304 or a PDL analysis unit 311, explained later using FIG. 3, is executed in the CPU 201, and temporary data currently being processed is held in the RAM 202.

The UI I/F 203 is connected to the operation unit 211, and notifies each module of signals of the operation unit 211. The network I/F 204 receives stream type PDL data from the information processing apparatus 101 via the network and stores it to the HDD 206. Various parameters and programs required for activation or execution of the image forming apparatus 102 are stored in the ROM 205, and are accessed from each software module as necessary. The HDD 206 is accessed from each module as a temporary storage of the PDL data received via the network or as a data swap region for the RIP 208 and the printer image processing unit 209.

The image bus I/F 207 acts as an intermediary between the system bus 220 and the image bus 230 of the image forming apparatus 102, and controls the communication between the side of the system bus 220 where control system software is operated and a module pertaining to page image processing that operates on the image bus 230. An RIP (raster image processor) 208 connected to the image bus 230 extracts a page description language (PDL) code into an image file. The printer image processing unit 209 performs resolution conversion or correction processing suitable for the printer engine 212 on an image file generated by the RIP 208. The engine I/F 210 is a communication I/F for an engine control unit 313 to control the printer engine 212 through an engine I/F 314.

<Software Configuration>

Next, explanation will be given for the software configuration of the image forming apparatus 102 with reference to FIG. 3. The image forming apparatus 102 is equipped with a job control unit 304, a network I/F 301, a network control unit 302, a data reception control unit 303, the PDL analysis unit 311, an RIP control unit 312, the engine control unit 313, the engine I/F 314, and a UI screen control unit 315. The job control unit 304 is equipped with a page control unit 305. The page control unit 305 is equipped with a page information management unit 306, a page storage unit 307, a page storage unit 308, an image conversion unit 309, and a print control unit 310. Each component is stored in a storage unit (one of the ROM 205, the RAM 202, the HDD 206) connected to the system bus 220, and is executed by the CPU 201. The RIP control unit 312 and the image conversion unit 309 are operated in cooperation with the RIP 208 and the printer image processing unit 209 connected to the image bus 230, in addition to hardware components connected to the system bus 220 as shown in FIG. 2. Also, the engine control unit 313 performs control of the printer engine 212 in cooperation with the engine I/F 210 connected to the image bus 230, in addition to hardware components connected to the system bus 220 described above.

The network I/F 301 controls the network I/F 204 and provides a socket I/F of TCP/IP to the network control unit 302. An application of the information processing apparatus 101 generates PDL data, such as a PDF, Postscript, PCL, XPS, TIFF, JPEG, or the like, and transmits the PDL data using a transmission protocol of either RAW/LPR. The network control unit 302 of the image forming apparatus 102 supports the RAW/LPR communication protocols, and receives the PDL data, and performs a writing to the HDD 206 successively as stream data via the data reception control unit 303 and a reception buffer. In a case where the network control unit 302 receives data, the job control unit 304 recognizes a reception initiation of a print job and initiates processing of the print job.

The job control unit 304 activates the PDL analysis unit 311, and makes an instruction for reading out of PDL data stored in the HDD 206 to the PDL analysis unit 311. The PDL analysis unit 311 extracts the PDL data read out from the HDD 206, and the PDL analysis unit 311 acquires finishing information such as a sheet size, a sheet type, a paper feed tray specification, or the like, for the input data, and performs analysis/rendering processing of a rendering command of each page. Intermediate page data to which the rendering processing is performed by the PDL analysis unit 311 is stored in the page storage unit 307. After that, RIP processing is performed in the RIP control unit 312 for the page data saved in the page storage unit 307, and a result is stored in the page storage unit 308 as an image optimized for the engine. In a case where the PDL analysis unit 311 detects information such as the page size, the sheet type of the page, or the like, the information is passed to the page information management unit 306 of the page control unit 305. The print control unit 310 acquires "page attributes" recorded in the page information management unit 306, performs paper selection of the paper feed tray from this information, and makes an instruction for processing for sheet feeding from the selected paper feed tray to the engine control unit 313. A print image is transferred to the printer engine 212 by the engine control unit 313 through the engine I/F 314, and image formation process is instructed.

<Processing Procedure>

Figure 4A:
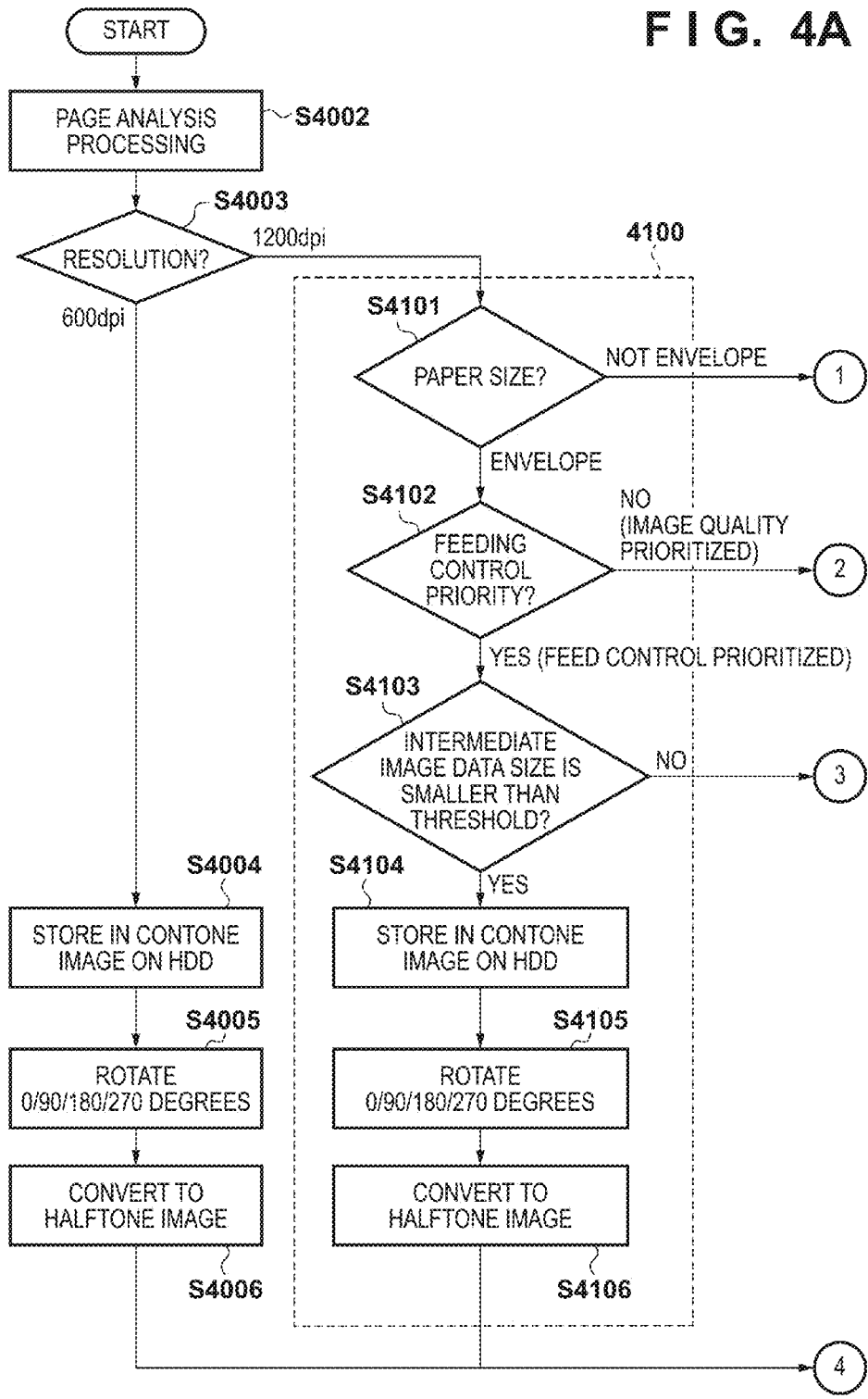
FIGS. 4A and 4B are a flowchart in the embodiment.
Figure 4B:
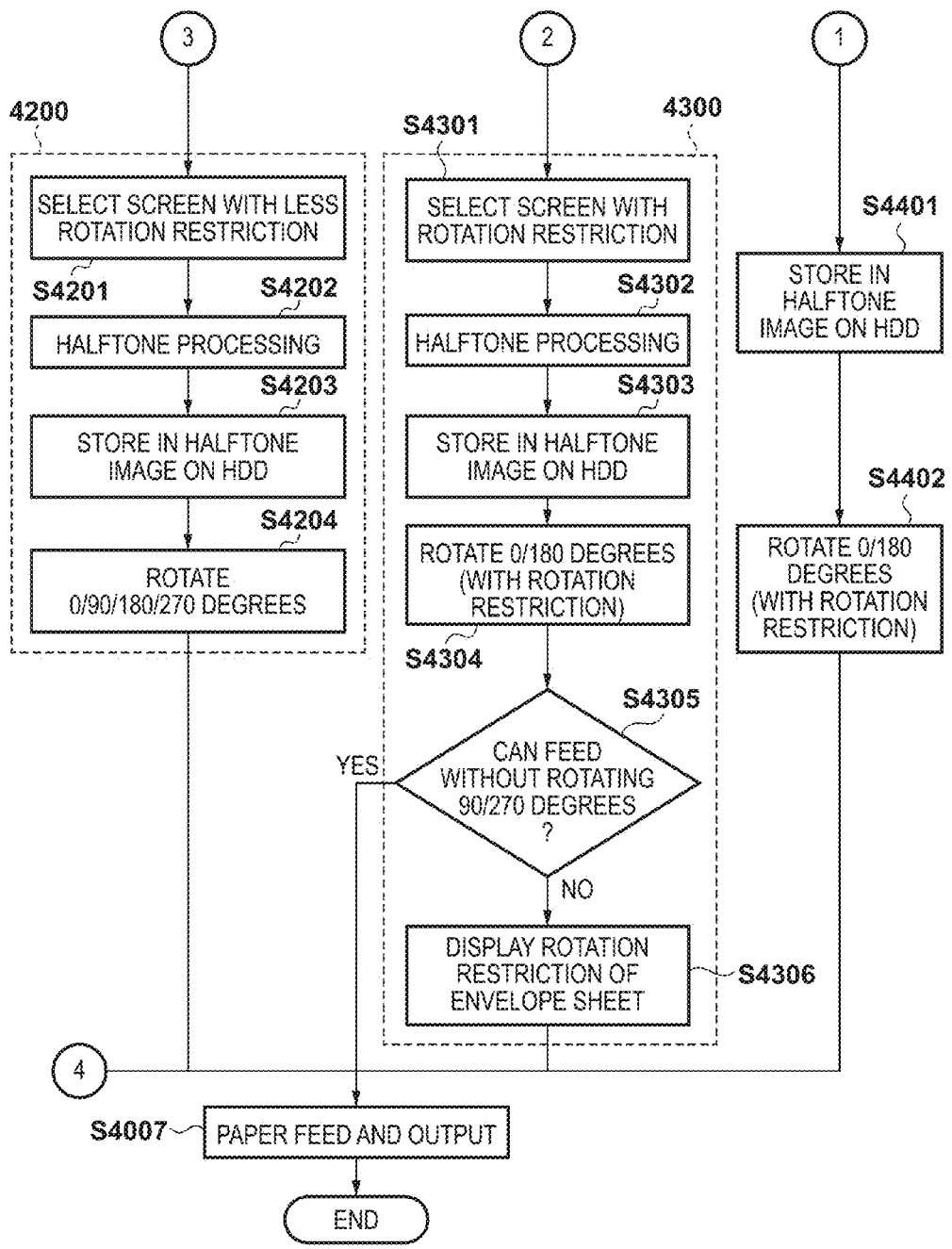
Figure 5A:
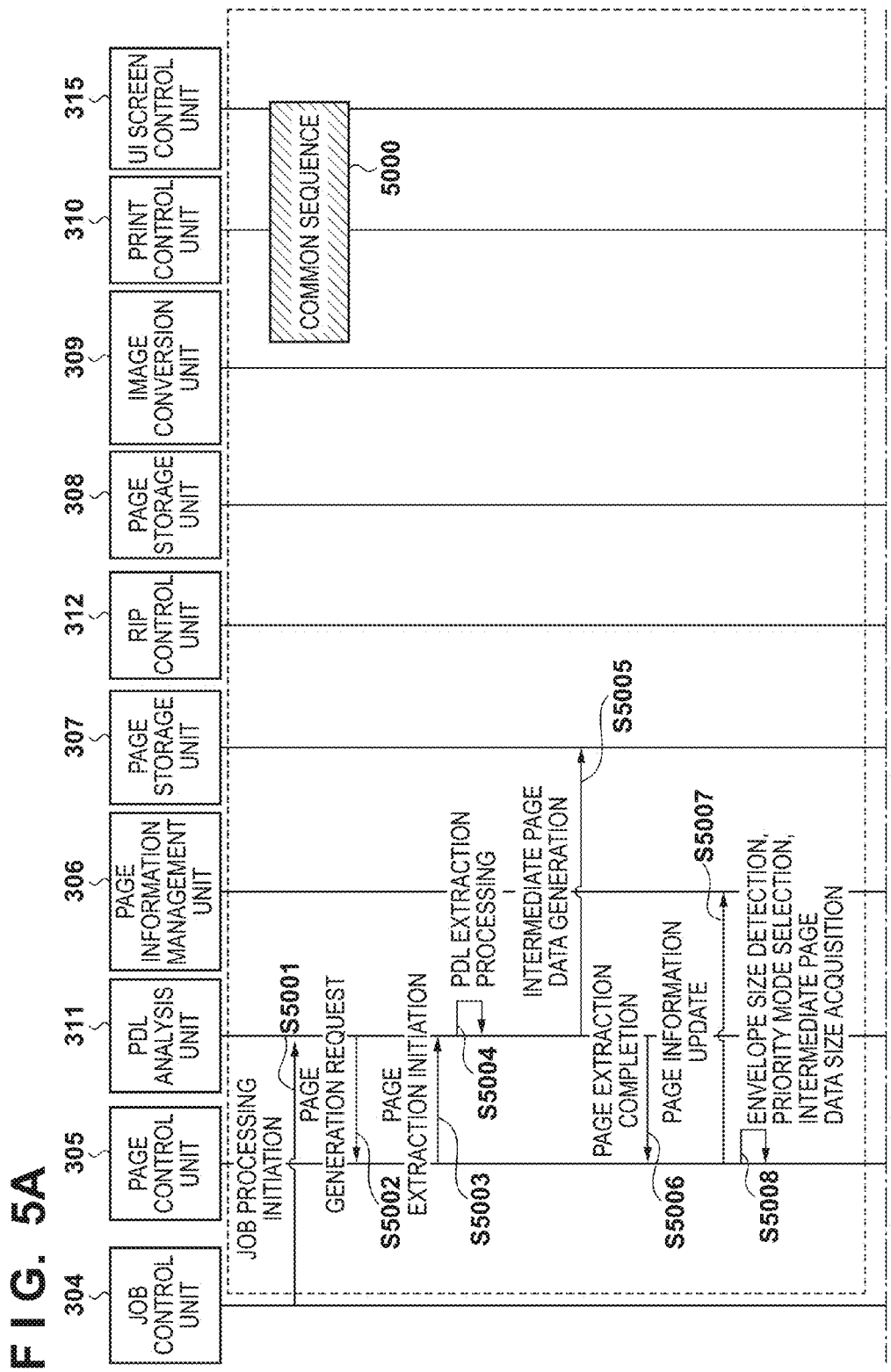
Figure 5B:
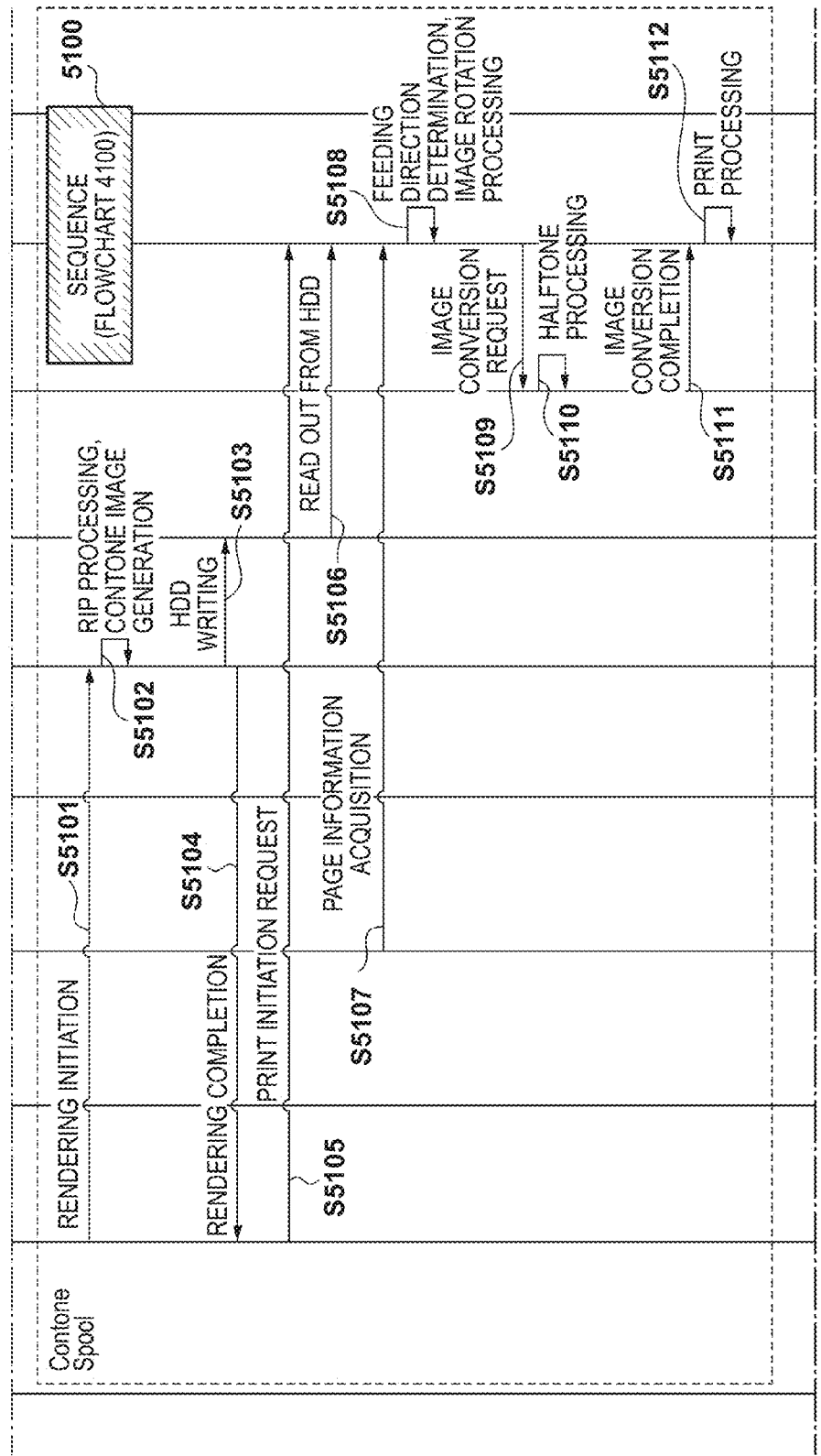

Next, with reference to FIGS. 4A and 4B, explanation will be given for a determination for switching a page image processing method by the page control unit 305 acquiring page information from the page information management unit 306, and for page processing after the determination. The overall flowchart is comprised of the branch processing 4100, 4200 and 4300. Sequences corresponding to each flowchart correspond to reference numerals 5100, 5200 and 5300 in FIGS. 5B to 5D, which is described later. The processing explained below is realized by the CPU 201 reading out a control program stored in the ROM 205 or the HDD 206 into the RAM 202 and executing the control program. Note, in the processing explained below, for the sheet onto which the image is printed, media (a sheet) for which the print image direction and the feeding direction are matched is assumed.

Firstly, when the page control unit 305 receives print data, the processing of this flowchart is initiated. In step S4002, the PDL analysis unit 311 executes page analysis processing for PDL data which is the received print data, and notifies the page information management unit 306 of page attribute information. In step S4003, the page control unit 305 acquires the resolution and the sheet size of the print job from the page attribute information, and determines a data processing resolution. Here, for example, it is determined whether the data processing resolution is 600 dpi (a predetermined value) or 1200 dpi. Note, intention is not to limit to these numeric values, and any numeric values can be set in accordance with the specifications of the image forming apparatus to which the present invention is applied.

In a case of 600 dpi, the processing proceeds to step S4004, and the page control unit 305 stores the print data in the HDD 206 in a contone image. After this, the processing proceeds to step S4005, and the page control unit 305, using the print control unit 310 and the image conversion unit 309, determines the paper feed tray for supplying sheets, and executes image processing such that the image is rotated in the feeding direction. Continuing on, in step S4006, the page control unit 305, using the image conversion unit 309, performs halftoning processing. After that, the processing proceeds to step S4007, and the engine control unit 313, using image processed print data, executes print processing, and completes the processing.

Meanwhile, when it is determined that the print data is 1200 dpi in step S4003, the processing proceeds to step S4101, and the page control unit 305, functioning as a size determination unit, determines whether or not the sheet size is a predetermined size. Here, it is determined whether or not the size is that of an envelope, for example. If the size is that of an envelope, the processing proceeds to step S4102, and the page control unit 305 refers to setting information indicating whether feeding direction control for a set envelope is prioritized (feeding control priority mode) or whether print image quality for the envelope is prioritized (image quality priority mode), which is set in advance in the image forming apparatus 102. Here, in a case where the setting information indicates the feeding control priority mode, the processing proceeds to step S4103. In step S4103, the page control unit 305 confirms a file size of intermediate image data that the PDL analysis unit 311 generates and stores in the page storage unit 307, and determines whether or not the size is less than or equal to a threshold. In a case where the file size is less than or equal to the threshold, the processing proceeds to step S4104, and using the RIP control unit 312, a contone image is generated, and stored in the page storage unit 308. After this, in step S4105, the page control unit 305, using the image conversion unit 309, or the like, rotates the contone image to match the sheet feeding direction of the envelope, and performs halftoning processing in step S4106. After that, the processing proceeds to step S4007, and the engine control unit 313, using print data that is image processed, executes print processing, and completes the processing.

Figure 6:
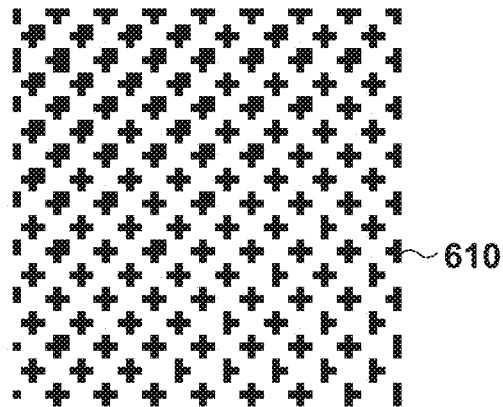
FIG. 6 is a screen sample view in the embodiment.
Figure 6:
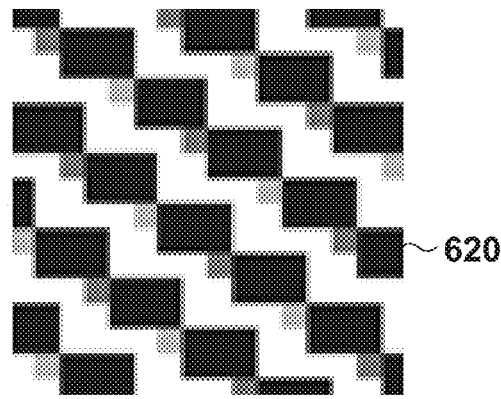

In a case where the size of intermediate image data exceeds the threshold in step S4103, the processing proceeds to step S4201, and the page control unit 305 selects a dither 610 of a rotation angle of 45 degrees shown in FIG. 6 for which deterioration of image quality is small even if the feeding direction for the envelope processing is rotated by 90/270 degrees. In step S4202, the page control unit 305, using the image conversion unit 309, performs halftoning processing, and stores a halftone image in the HDD 206 in step S4203. After that, in step S4204, the page control unit 305 rotates the image to match the sheet feeding direction of the envelope. After that, the processing proceeds to step S4007, and the engine control unit 313, using print data that is image processed, executes print processing, and completes the processing.

In a case where it is determined that the setting information indicates "the image quality priority mode" in step S4102, the processing proceeds to step S4301, and a dither 620 for image quality prioritization for which a rotation angle is not 45 degrees, as shown in FIG. 6, is selected, and furthermore, selection is made so that only rotations of 0/180 degrees are possible, and 90/270 degrees rotations are impossible. In other words, setting is performed so as to restrict an image rotation angle. Continuing on, in step S4302, the page control unit 305 performs halftoning processing using the image conversion unit 309, and stores the halftone image in the page storage unit 308 in step S4303. In step S4304, the page control unit 305 rotates the image 0/180 degrees, and selects, in step S4305, a paper feed tray selectable with a 0/180 degree rotation (with a rotation restriction). In a case where such a paper feed tray can be selected, the processing proceeds to step S4007. In a case where a corresponding paper feed tray by which printing of an image is possible does not exist, i.e. in a case where the direction of sheets placed in the paper feed tray does not match in the restricted rotation angle rotation processing, the processing proceeds to step S4306. Then, the page control unit 305 displays a warning relating to an envelope sheet feeding direction restriction (image rotation restriction), and the processing proceeds to step S4007. After that, the processing proceeds to step S4007, and the engine control unit 313, using print data that is image processed, executes print processing, and completes the processing.

In a case where the sheet size is other than that of an envelope in step S4101, the processing proceeds to step S4401, and the page control unit 305 performs halftoning processing using the image conversion unit 309, and in step S4402, the image is rotated 0/180 degrees. After that, the processing proceeds to step S4007, and the engine control unit 313, using print data that is image processed, executes print processing, and completes the processing.

<Sequence>

Next, with reference to FIGS. 5A to 5D, explanation will be given for a sequence relating to each control unit in the processing explained in FIGS. 4A and 4B. FIGS. 5A to 5D are comprised of four parts. FIGS. 5A to 5D include the sequence sections 5000, 5100, 5200, and 5300. The sequence section 5000 corresponds to a common part for reference numerals 4100, 4200 and 4300 of FIGS. 4A and 4B, and is common processing that precedes the later the sequence sections 5100, 5200, and 5300. The sequence section 5100 corresponds to the flowchart 4100 of FIGS. 4A and 4B, the sequence section 5200 corresponds to the flowchart 4200, and the sequence section 5300 corresponds to the flowchart 4300.

Firstly, explanation will be given for the common sequence section 5000. In step S5001, the job control unit 304 makes an instruction to the PDL analysis unit 311 for job processing initiation, and in step S5002, the PDL analysis unit 311 issues a page generation request to the page control unit 305. In step S5003, the page control unit 305 makes an instruction to the PDL analysis unit 311 for a page extraction initiation, and in step S5004, the PDL analysis unit 311 performs PDL extraction processing. The PDL analysis unit 311, after generating intermediate page data and, in step S5005, storing it in the page storage unit 307, makes a notification to the page control unit 305 of the page extraction completion in step S5006. The page control unit 305 receives the completion notification from the PDL analysis unit 311, and in step S5007 updates page information of the page information management unit 306. In step S5008, the page control unit 305 acquires the resolution/sheet size of page information notified by the PDL analysis unit 311, and determines whether or not the processing page size is the size of an envelope (step S4101).

Next, explanation will be given for the sequence section 5100 (flowchart 4100). In this section, under the presupposition that the file size of an intermediate image of an envelope page after PDL extraction processing is smaller than the size of a normal print image that is text-centered such as an address, after a contone image spool, halftoning processing is performed upon printing. If, as a processing path, the data size of the input image is less than or equal to a fixed threshold though a load is high (Yes in step S4103), it is possible to perform the image rotation processing matching the sheet feeding direction upon printing, and this is the most desirable processing path. In other words, in the such a case, it can be said that because it is not necessary for the user to consider the direction when the user places a sheet (an envelope) in a paper feed tray, this is a most user friendly system for operation.

In step S5101, the page control unit 305 notifies the RIP control unit 312 of rendering initiation, and in step S5102, the RIP control unit 312 generates a contone image by executing RIP processing. Continuing on, in step S5103, the RIP control unit 312 writes page data to the page storage unit 308, and, in step S5104, transmits a rendering completion notification to the page control unit 305. In step S5105, the page control unit 305 outputs a print initiation request to the print control unit 310, and the print control unit 310 reads out an image from the page storage unit 308 in step S5106, and in step S5107, page information is acquired from the page information management unit 306. In step S5108, the print control unit 310 selects a paper feed tray for feeding sheets, determines the feeding direction from the sheet direction of the envelope set in the paper feed tray, and rotates the image to match the direction of the sheet. After that, in step S5109, the print control unit 310 outputs an image conversion request to the image conversion unit 309, and in step S5110, the image conversion unit 309 performs a halftone image conversion to match the feeding direction determined in step S5108. The print control unit 310 receives a conversion completion notification from the image conversion unit 309 in step S5111, and performs print processing in step S5112.

Next, explanation will be given for the sequence section 5200 (flowchart 4200). In this section, prior to determination of the paper feed tray/feeding direction in step S5212, a halftone image conversion is performed, and storage to the HDD 206 is performed. For an envelope page for which the required image quality is not high, a dither of a 45 degree rotation angle for which there are few restrictions on rotation processing is applied, and halftoning processing is performed. With this, a processing path capable of image rotation in the direction of the envelope upon sheet feeding is realized, even as the processing path is for directly converting data of the page storage unit 307 into a halftone image In step S5201, the page control unit 305, from the sheet size and resolution, selects a dither of a 45 degree rotation angle, for which there are few feeding direction restrictions upon printing, upon halftoning processing, and, in step S5202, makes an instruction to the RIP control unit 312 for rendering processing. In step S5203 through step S5205, the RIP control unit 312 in cooperation with the image conversion unit 309 performs RIP processing and halftoning processing. In step S5206, the image conversion unit 309 makes a notification to the RIP control unit 312 of a completion notification when the conversion processing ends. The RIP control unit 312 stores a halftone image in the page storage unit 308, and makes a notification to the page control unit 305 of a rendering completion notification. In step S5209, the page control unit 305 outputs a print initiation request to the print control unit 310, and the print control unit 310 in step S5210 acquires the page information from the page information management unit 306. In step S5211, the print control unit 310 acquires a print image corresponding to the page information from the page storage unit 308. After this, in step S5212, the print control unit 310 selects a paper feed tray for feeding sheets, determines the feeding direction from the sheet direction of the envelope set in the paper feed tray, and rotates the image to match the direction of the sheet, and performs print processing in step S5213.

Next, explanation will be given for the sequence section 5300 (flowchart 4300). In this section, prior to determination of the paper feed tray/feeding direction in step S5311, a halftone image conversion is performed, and storage to the HDD 206 is performed. A dither used in halftoning processing in this case is of a type for which there is a restriction of the feeding direction upon printing (the rotation angle is not 45 degrees) because in accordance with the determination of step S4102, the image quality priority mode is the mode. In a case where the result of this is that the paper feed tray setting upon sheet feeding and the feeding direction of the print data generated do not match, a UI display for when there is a sheet feeding error is performed.

In step S5301, the page control unit 305 determines the feeding direction from the sheet size and the resolution, and having reflected that in rendering parameters, makes an instruction to the RIP control unit 312 for rendering initiation. In step S5302, the RIP control unit 312 performs RIP processing, and in step S5303 notifies the image conversion unit 309 of an image conversion request. In step S5304, the image conversion unit 309, because the mode is the image quality priority mode, performs halftoning processing using a screen having a rotation restriction, and in step S5305 transmits an image conversion completion notification to the RIP control unit 312. In step S5306, the RIP control unit 312 performs a write to the page storage unit 308. After that, in step S5307, the RIP control unit 312 transmits a rendering completion notification to the page control unit 305.

In step S5308, the page control unit 305 transmits a print initiation request to the print control unit 310. In step S5309, the print control unit 310 acquires page information from the page information management unit 306, and continuing on, in step S5310, reads out a halftone image from the page storage unit 308. Continuing on, in step S5311, the print control unit 310 confirms whether a direction in which halftone image sheet feeding is possible and the feeding direction of a paper feed tray match. When there is no paper feed tray in which sheets are placed in a sheet feeding direction appropriate with respect to the halftone image, in step S5312, a warning display indicating that an appropriate paper feed tray cannot be selected is performed on the UI screen control unit 315. The user, having received the warning display, changes/sets the direction of the sheets to match the halftone image in step S5313, and the UI screen control unit 315 accepts an instruction for resuming printing in step S5314. In step S5315, the print control unit 310 receives this instruction and performs print processing. With this, in a case where rotation restrictions occur in the image quality priority mode, a balance is struck between image processing time, print image quality, and a feeding direction restriction by feeding back the feeding direction error on the UI screen, and the user is able to perform printing of envelope data.

<Sample Images>

Next, with reference to FIG. 6, explanation will be given for samples of dithers that the image forming apparatus 102 applies in the halftone conversion processing in the present embodiment. Reference numeral 610 denotes a 45 degree rotation angle dither which is a dither for which 90 degree/270 degree image rotation is possible. Reference numeral 620 denotes a non-45 degree rotation angle dither which is a dither for which only 0 degree/180 degree rotation is permitted.

As explained above, the image forming apparatus 102 according to the present embodiment, in a case of printing an image to be printed at a resolution of 1200 dpi, if a sheet size is a size other than the size of an envelope, execution of halftoning processing prior to storing the image in the HDD 206 is performed. In such a case, if the printing is actually performed, a restriction is put on rotation of the image. Meanwhile, in a case where the resolution is not 1200 dpi, such as a case where it is 600 dpi, for example, the image is first stored in the HDD 206, and after that, halftoning processing is executed upon printing. However, by virtue of the present embodiment, even if the resolution of the image to be printed is 1200 dpi, if the sheet size is that of an envelope (predetermined size), similar control is performed as in the case of 600 dpi. This is because the load of the processing is not large since the size of the image of an envelope size is small. With this, by virtue of the present embodiment, when the sheet size is the envelope size, even in the case where rotation of the image is necessary due to the direction in which the envelope is set, it is possible to provide a user friendly system of operation in which the image is rotated and printing can be performed without the printing being stopped.

In other words, by virtue of the present embodiment, with regards to an envelope page, it becomes possible to select an image processing path for printing in an image forming apparatus having comparatively weak calculation capabilities in accordance with the processing load. As a result, the image forming apparatus according to the present embodiment can achieve both output quality and output speed while suppressing an arithmetic processing load to less than or equal to a fixed level for media for which the direction of the print image is matched to the feeding direction such as in the case of "an envelope".

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-017739 filed on Jan. 31, 2014, which is hereby incorporated by reference herein in its entirety.

What is claimed is:

1. An image forming apparatus, comprising:
a memory;
a controller configured to:
receive image data, in a case where the image data has a first resolution, store the image data in the memory without halftone processing, in a case where the image data has a second resolution higher than the first resolution, store the image data in the memory after the halftone processing thereof, and perform rotation processing for the image data stored in the memory in accordance with a direction of a sheet; and an image forming device configured to form an image on the sheet based on the image data for which the rotation processing is performed, wherein the controller is configured to, in a case where the halftone processing has been performed for the image data stored in the memory and a direction of the sheet does not correspond to a direction of the image data stored in the memory:

perform, if a type of the sheet is an envelope, a rotation processing of the image data, and cause the image forming device to perform image forming on the sheet based on the rotated image data, and cause, if the type of the sheet is not an envelope, a display device to display an alert screen without performing the rotation processing.

2. The image forming apparatus according to claim 1, wherein the controller is configured to, in a case where the halftoning processing has not been performed, perform halftone processing for the image data after performing the rotation processing for the image data stored in the memory, and control the image forming device to perform image forming on the sheet.

3. The image forming apparatus according to claim 1, wherein a feeding control priority mode that prioritizes a feeding direction of the sheet and an image quality priority mode that prioritizes an image quality can be set, and wherein the controller is configured to:

in a case where a size of the sheet is a predetermined size, in the case where the image quality priority mode is set and irrespective of whether or not the size of the image data is less than or equal to a threshold, store image data to which the halftoning processing is performed, in the memory, and perform, in accordance with the direction of the sheet, after performing rotation processing for which a rotation angle is restricted on the image data stored in the memory, image forming on the sheet.

4. The image forming apparatus according to claim 3, wherein the controller is configured to, in a case where, when the rotation processing is to be performed for which the rotation angle is restricted and the direction of the sheet does not match, display a screen indicating that the image forming cannot be executed.

5. The image forming apparatus according to claim 3, wherein the controller is configured to, in a case where, when the rotation processing is to be performed for which the rotation angle is restricted and the direction of the sheet does not match, display a screen prompting a user to rotate the sheet.

6. The image forming apparatus according to claim 3, wherein the controller is configured to, in a case where, when performing the image forming on the sheet, in the rotation processing for which the rotation angle is restricted the direction of the sheet does not match, display a screen indicating that the image forming cannot be executed.

7. The image forming apparatus according to claim 3, wherein the controller is configured to, in a case where, when performing the image forming on the sheet, in-the rotation processing for which the rotation angle is restricted the direction of the sheet does not match, display a screen prompting a user to rotate the sheet.

8. The image forming apparatus according to claim 1, wherein the controller is configured to, in a case where the type of the sheet is not an envelope:

store image data to which the halftoning processing is performed in the memory unit, and perform, in accordance with the direction of the sheet, after performing rotation processing for which a rotation angle is restricted on image data stored in the memory, image forming on the sheet.

9. The image forming apparatus according to claim 1, wherein the controller is configured to, in a case where the type of the sheet is an envelope and a size of the image data exceeds a threshold, select a dither for which a rotation angle is 45 degrees and for which there are few rotation angle restrictions, and store the image data to which the halftoning processing is performed in the memory.

10. The image forming apparatus according to claim 3, wherein the controller is configured to, in a case where the size of the sheet is the predetermined size and the image quality priority mode is set, select a dither for which a rotation angle is not 45 degrees and for which there are many rotation angle restrictions, and store image data to which the halftoning processing is performed in the memory.

11. The image forming apparatus according to claim 1, wherein the controller is configured to determine whether or not the type of the sheet is an envelope, and determine whether or not the rotation processing is performable, based on a result of determining the type of the sheet.

12. The image forming apparatus according to claim 1, further comprising the display device, wherein the controller is configured to cause the display device to display a warning screen in a case where it is determined that the rotation processing is not performable.

13. A method of controlling an image forming apparatus comprising a memory and a controller, the method comprising:

receiving, in the controller, image data;

in a case where the image data has a first resolution, storing, in the controller, the image data in the memory without halftone processing;

in a case where the image data has a second resolution higher than the first resolution, storing, in the controller, the image data in the memory after the halftone processing thereof;

in a case where the halftone processing has been performed for the image data stored in the memory and a direction of the sheet does not correspond to the direction of the image data stored in the memory:

performing, if a type of the sheet is an envelope, a rotation processing of the image data, and causing the image forming device to perform an image forming on the sheet based on the rotated image data, and causing, if the type of the sheet is not an envelope, a display device to display an alert screen without performing the rotation processing.

14. A non-transitory computer-readable storage medium storing a program for causing a computer to execute each step of a method of controlling an image forming apparatus comprising a memory and a controller, the method comprising:

receiving, in the controller, image data;

in a case where the image data has a first resolution, storing, in the controller, the image data in the memory without halftone processing;

in a case where the image data has a second resolution higher than the first resolution, storing, in the controller, the image data in the memory after the halftone processing thereof;

in a case where the halftone processing has been performed for the image data stored in the memory and a direction of the sheet does not correspond to a direction of the image data stored in the memory:

performing, if a type of the sheet is an envelope, a rotation processing of the image data, and causing the image forming device to perform an image forming on the sheet based on the rotated image data, and causing, if the type of the sheet is not an envelope, a display device to display an alert screen without performing the rotation processing.

* * * * *